United States Patent Office 3,289,254
Patented Dec. 6, 1966

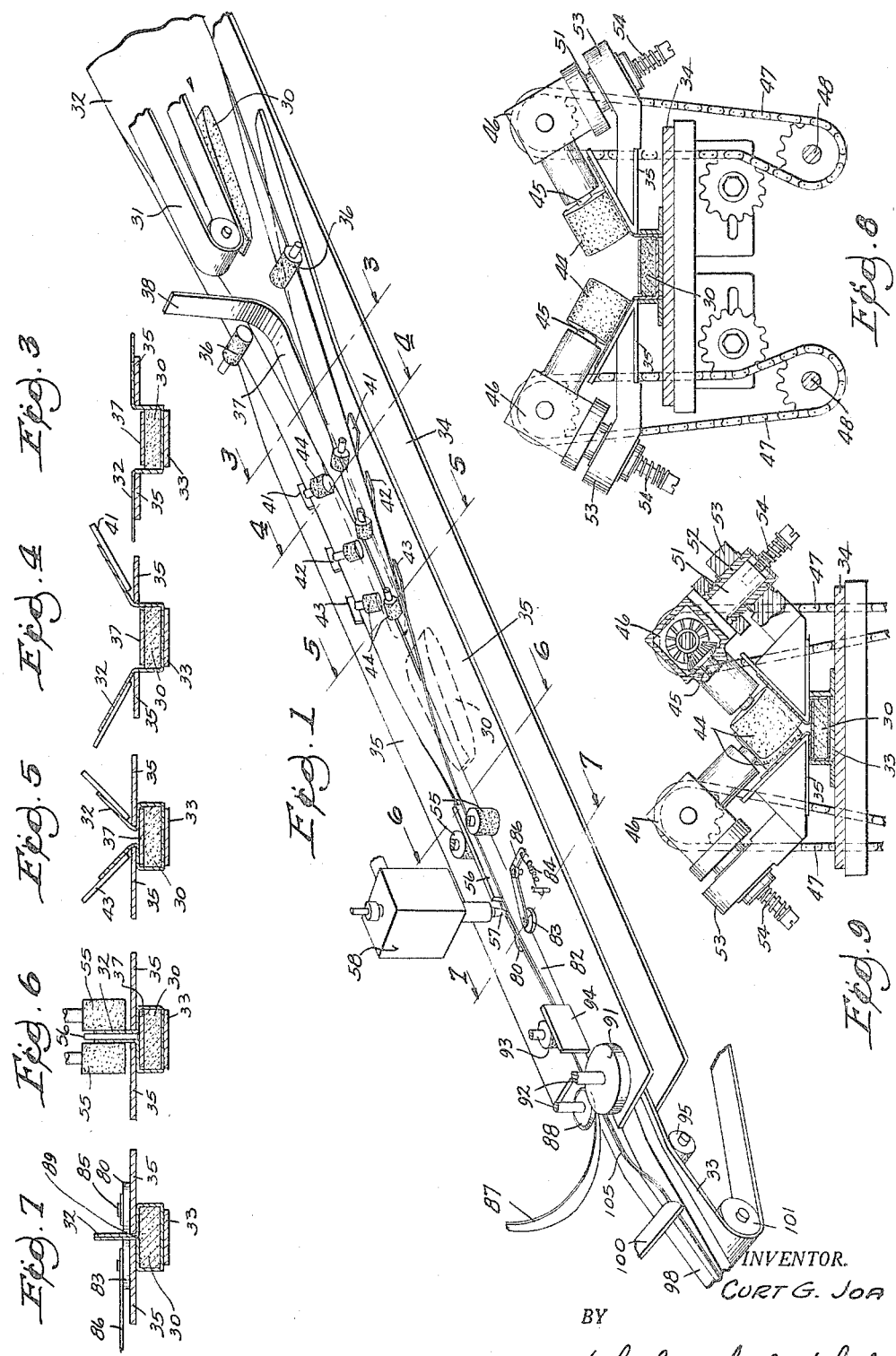

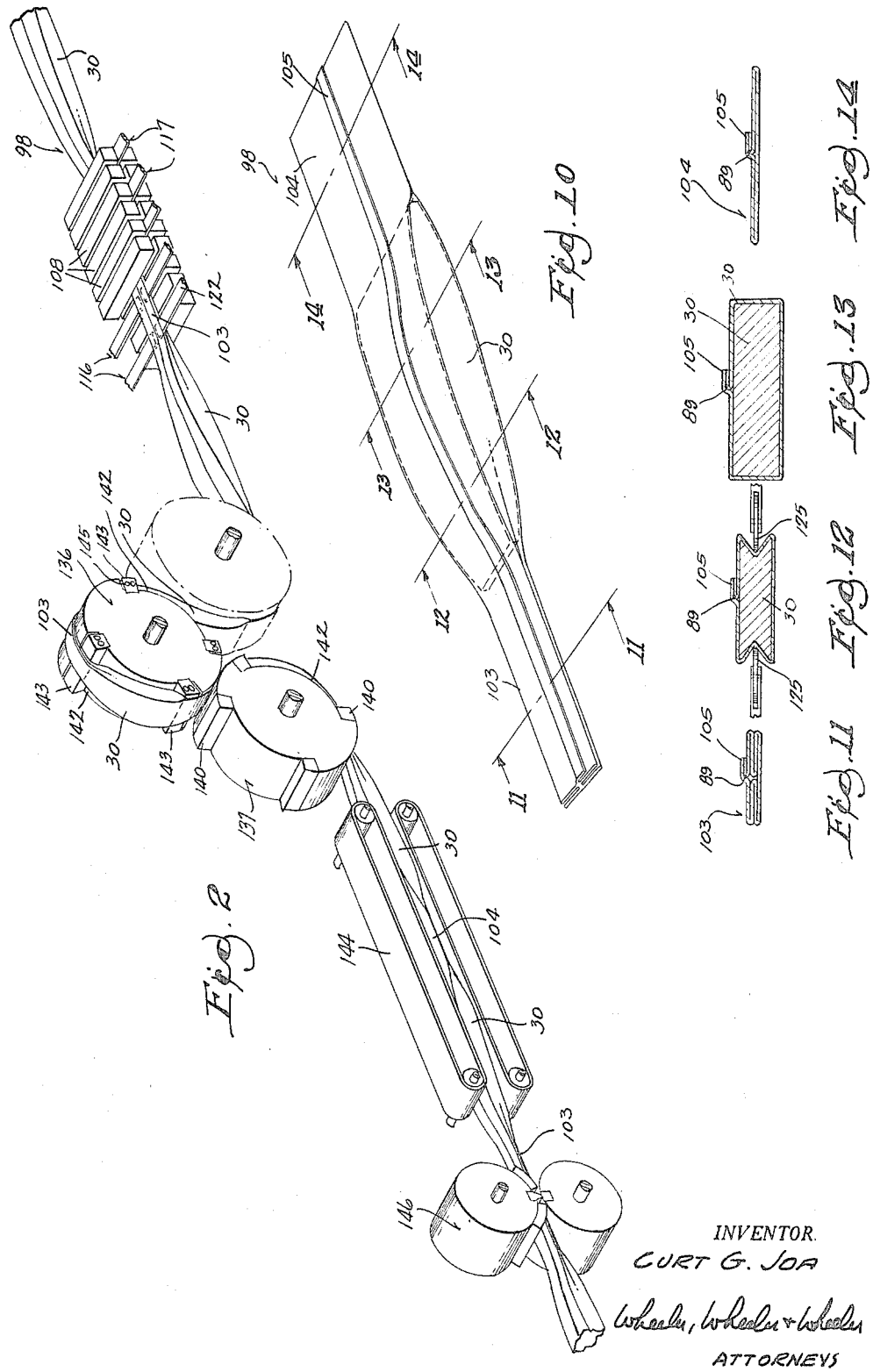

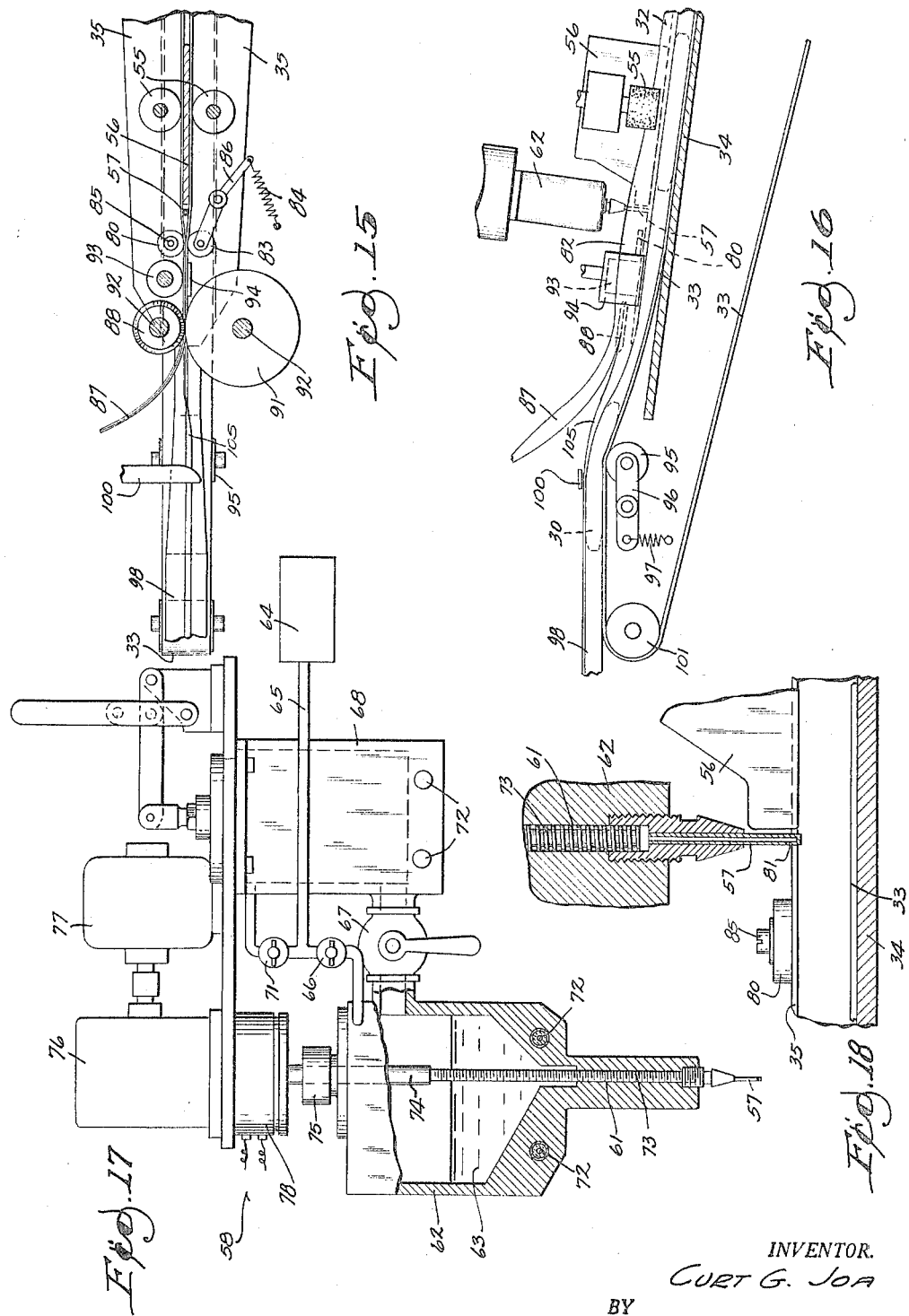

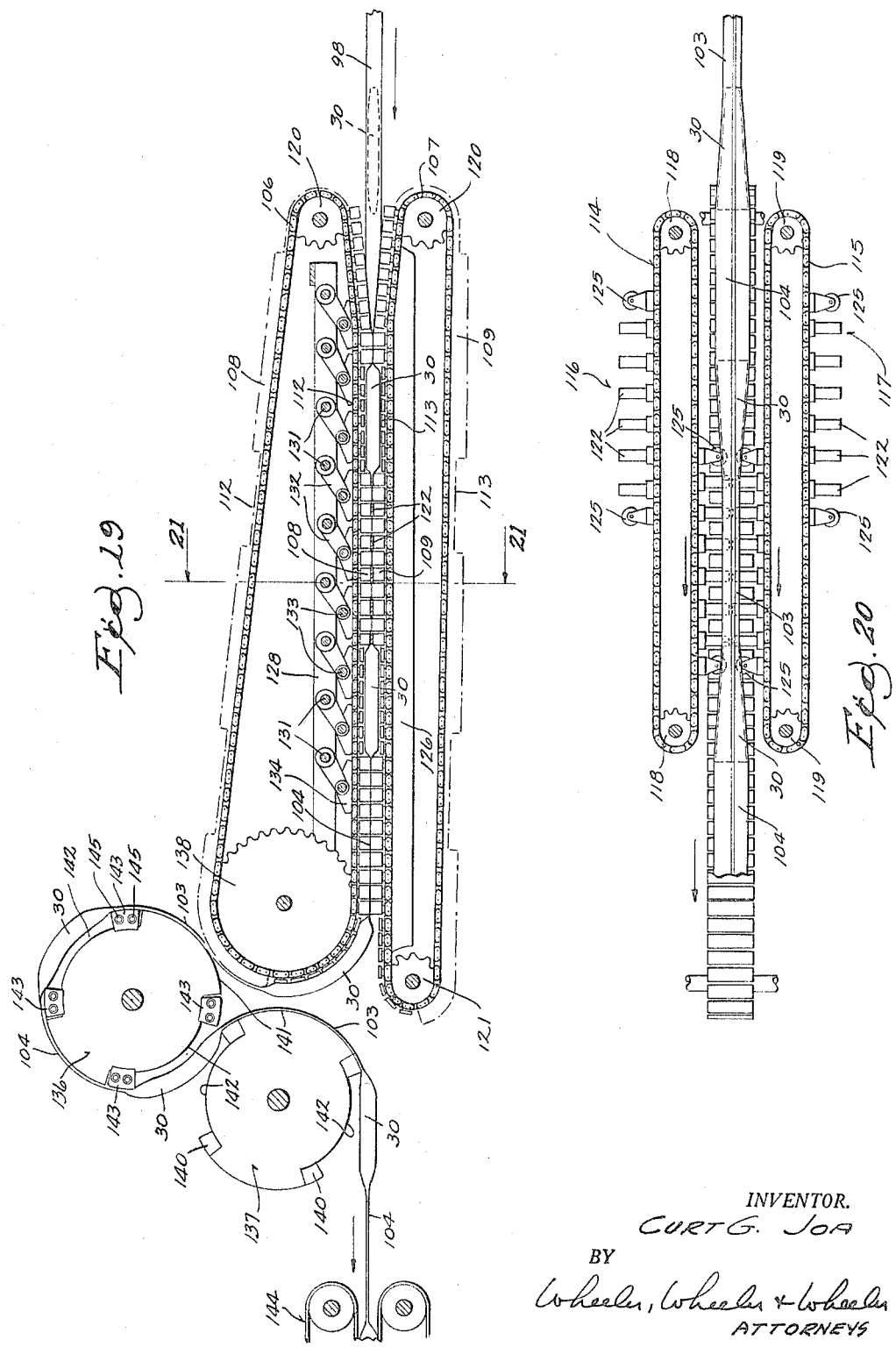

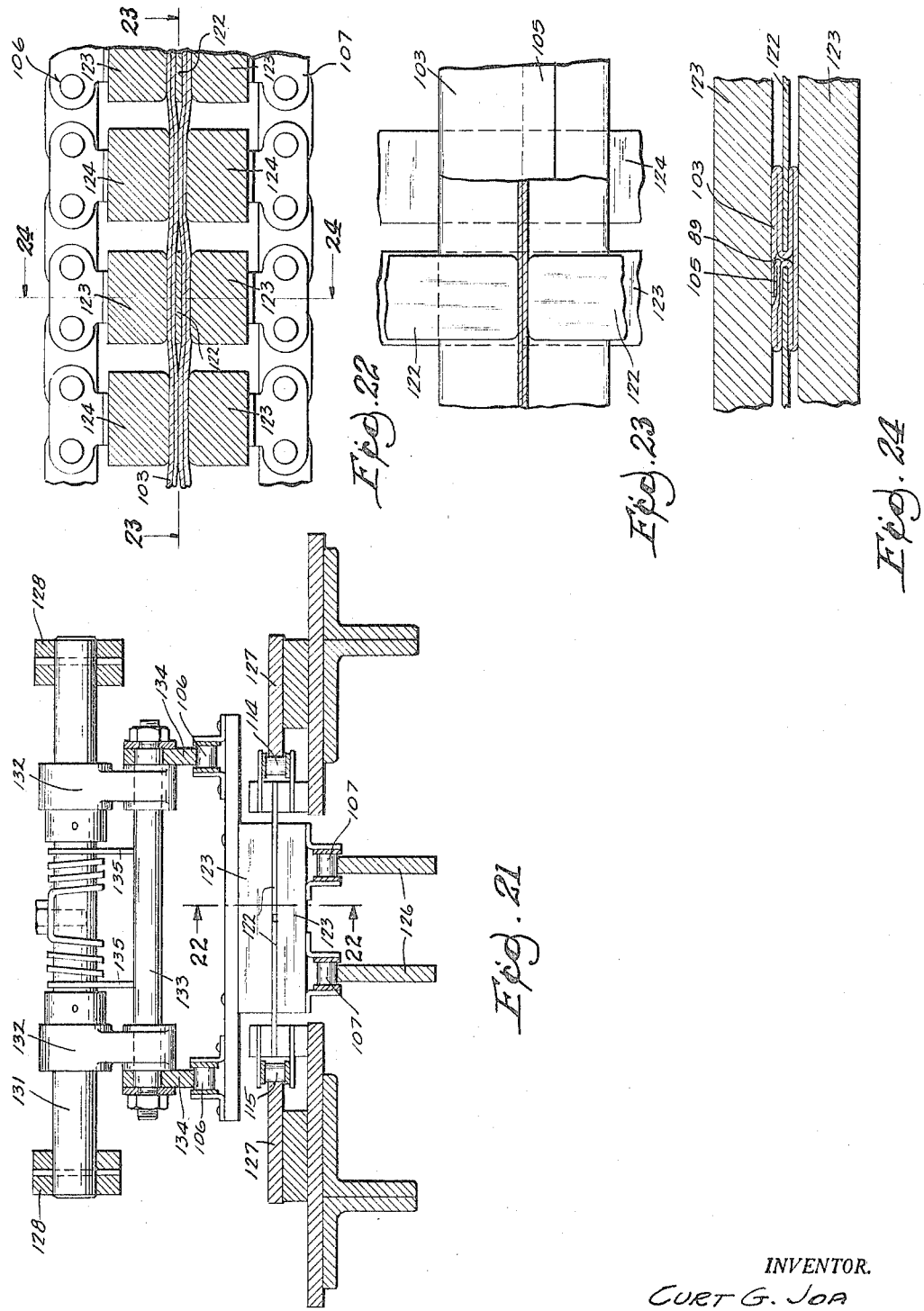

3,289,254
MACHINE FOR MANUFACTURING SANITARY
NAPKINS AND THE LIKE
Curt G. Joa, Ocean Ridge, Fla.
(Box 1121, Boynton Beach, Fla.)
Filed Feb. 2, 1961, Ser. No. 95,767
14 Claims. (Cl. 19—145)

This invention relates to a machine for manufacturing sanitary napkins and the like.

The invention will be described in connection with its embodiment in a machine to manufacture tapered sanitary napkins, although many features of the invention herein disclosed are not limited to fabrication of a tapered napkin.

An important feature of the invention relates to the sealing of abutting marginal strip portions of the wrapping sleeve in which the napkin pads are confined. The respective pads are spaced within the sleeve and are interconnected by empty web portions of the sleeve which are ultimately severed in the course of sanitary napkin manufacture to produce individual wrapped napkins with attaching fabric strips.

According to the present invention, a longitudinal seam is formed along the sleeve and is sealed, desirably by the injection of a thermoplastic adhesive between marginal strip portions of the wrapper which have previously been brought into upstanding abutting relationship along substantially the medial line of the sleeve.

While the invention is not limited to any specific form of mechanism for injecting thermoplastic adhesive between the marginal strip portions of the wrapping web, a particularly effective heating mechanism has been developed in connection therewith and is disclosed and claimed herein. This mechanism includes a melting pot which is pressurized to force molten adhesive through a duct in which a screw-threaded auger conveyor extends. When the auger conveyor is held stationary, no adhesive will flow through the duct. When the auger conveyor is rotated, the pressure on the fluid is effective to discharge the same through a nozzle at the end of the duct.

The invention also relates to the side folder mechanism which snugs the wrapper around the napkin pads and which folds the marginal strip portions thereof into upstanding abutting relationship preparatory to injecting the thermoplastic adhesive therebetween.

Another feature of the invention relates to the tucking into neat folds of plies of the interconnecting web of wrapper material between pads within the sleeve. The greater bulk of the pad will require more wrapping material in those sleeve portions about a pad than will be required in the gaps between pads. According to the present invention, excess wrapper material about the gaps is folded or tucked into multiple layer flat strips linking adjacent spaced pads. For this purpose I provide a novel side tucking mechanism having tucking fingers which move on rectilinear paths in time with the sleeve and which desirably coact with the sleeve pulling conveyor mechanism so that the web links are tucked and pulled concurrently. This feature of the invention is particularly advantageous where the pads are tapered. A tapered pad has more wrapping material in the web links interconnecting small ends of the pads than do untapered pads, although the invention is also applicable to untapered pads if they have rounded ends.

The invention also relates to structure for heat sealing the opposite plies of the web links together and to the pads in the vicinity of the ends of the napkins, thus to prevent separation of the web plies at this point.

Other objects, features and advantages of the invention will appear from the following disclosure in which:

FIG. 1 is a diagrammatic perspective view showing that portion of the apparatus which initially ensleeves the napkin pads.

FIG. 2 is a diagrammatic perspective view of that portion of the machine which constitutes a continuation of the apparatus shown in FIG. 1 and which includes the means for tucking the web links and sealing the wrappers at the ends of the napkin pads.

FIG. 3 is a fragmentary cross section taken along the line 3—3 of FIG. 1.

FIG. 4 is a fragmentary cross section taken along the line 4—4 of FIG. 1 and having portions omitted.

FIG. 5 is a fragmentary cross section taken along the line 5—5 of FIG. 1 and having portions omitted.

FIG. 6 is a fragmentary cross section taken along the line 6—6 of FIG. 1.

FIG. 7 is a fragmentary cross section taken along the line 7—7 of FIG. 1.

FIG. 8 is a cross section which shows in much greater detail the apparatus on line 4—4 of FIG. 1 and which is shown fragmentarily in FIG. 4.

FIG. 9 is a cross section which shows in much greater detail the apparatus on line 5—5 of FIG. 1 and which is shown fragmentarily in FIG. 5.

FIG. 10 is a perspective view of a completed sanitary napkin fabricated according to the present invention.

FIG. 11 is a cross section taken along the line 11—11 of FIG. 10.

FIG. 12 is a cross section taken along the line 12—12 of FIG. 10, tucking wheels not shown in FIG. 10 being added.

FIG. 13 is a cross section taken along the line 13—13 of FIG. 10.

FIG. 4 is a cross section taken along the line 14—14 of FIG. 10.

FIG. 15 is a fragmentary plan view of that part of the apparatus shown near the left-hand end of FIG. 1.

FIG. 16 is a side elevation of that portion of the apparatus of FIG. 1 which is shown in FIG. 15.

FIG. 17 is a greatly enlarged elevation, partly in section, of the thermoplastic adhesive injecting mechanism.

FIG. 18 is a fragmentary enlarged view of the nozzle portion of the apparatus shown in FIG. 17, and its association with the ensleeving apparatus shown in FIG. 1.

FIG. 19 is a side elevation showing in considerable detail the sleeve propelling and web tucking unit which is otherwise shown only diagrammatically in FIG. 2.

FIG. 20 is a plan view of the apparatus shown in FIG. 19, but with the upper conveyor mechanism removed.

FIG. 21 is a cross section taken along the line 21—21 of FIG. 19.

FIG. 22 is a fragmentary cross section taken along the line 22—22 of FIG. 21.

FIG. 23 is a fragmentary cross section, substantially along the line 23—23 of FIG. 22.

FIG. 24 is a fragmentary cross section taken along the line 24—24 of FIG. 22.

Cross reference is made to my United States Patents 2,131,808 and 2,960,143, which show sanitary napkin manufacturing machines over which the present invention is an improvement.

As in my United States patents aforesaid, sanitary napkin pads 30 or the like may be delivered to the ensleeving apparatus by conveyor belt 31 which deposits the pads 30 in spaced relation upon a pad wrapping web 32. Web 32 may be conventional gauze or may be any other woven or non-woven fabric, although preferably thermo-adhesive and suitable for use in wrapping the cellucotton pads 30.

The web 32 is propelled from beneath by conveyor belt 33 which rides on a fixed apron or runner 34. Belt 33 is desirably confined between longitudinally extending angle brackets having uppermost laterally extending wings 35 against which marginal strip portions of web 32 are folded by the rollers 36. A tongue 37 having an upwardly turned runner 38 guides the pads 30 into a throat beneath the tongue 37 and above the belt 33. The wings 35 gradually converge as the pads 30 are advanced by belt 33 to progressively form the web 32 into a continuous sleeve about the spaced pads 30 therein.

In my prior patents aforesaid, the marginal strip portions of the web are overlapped by the converging wings and no attempt is made to seal the strip portions together.

According to the present invention, however, the marginal strip portions of the web 32 are gradually brought into upstanding abutting relationship, as is diagrammatically shown in FIG. 7. To fold the strip portions gradually upwardly, I provide a series of pairs of plate segments 41, 42, 43, each pair being disposed at a progressively increased angle with respect to the wings 35 in order to gradually fold the marginal strip portions from their horizontal position shown in FIG. 3 into their upstanding abutting relationship shown in FIG. 7.

In order to snugly ensleeve the pads 30 within the wrapping web 32, each pair of folding plates 41, 42, 43 is desirably provided with power driven felt-covered side folder rollers 44 which are desirably disposed on axles 45 inclined slightly to a transverse line through the path of web movement as shown in FIGURES 8 and 9. Rollers 44 are positively driven through angle drive gear mechanisms 46 to tend to feed the marginal strip portions of the web 32 both forwardly and slightly outwardly. The outward component of roller pressure maintains outward tension on the webs in order to snug the webs tightly about pads 30.

The several gear boxes 46 may be driven from a pair of line shafts 48 by chains 47. Each box 46 is mounted on a stem or plunger 51 which is movable in a socket 52 formed in suitable inclined bracket 53 on the wings 35. Each stem 51 is biased by a coil spring 54 toward pressure engagement of its roller 44 with its respective plate segment 41, 42, 43. If a thick section of web fabric travels through the machine, the rollers may yield upwardly against the bias of springs 54 to pass the same.

Folding plate segments 41, 42, 43 may be longitudinally separate or discontinuous as shown in the instant drawings, or they may comprise portions of a continuous plate which is twisted from a substantially horizontal position to an upwardly inclined position along the wings 35.

Note from FIGS. 3 through 7 that as the plate segments 41, 42, 43 increase in angle with respect to the wings 35, the wings approach closer together until they are at their minimum spacing, as shown in FIGS. 6 and 7. At this stage in the ensleeving operation, web 32 is substantially completely ensleeved about the spaced pads 30 and the marginal strip portions thereof are in upright abutting relation.

As best shown in FIG. 6, upright rollers 55 form the upstanding marginal strip portions of the web 32 against an intervening separator or divider plate 56 beyond the end of which is disposed the injection nozzle 57 of a thermoplastic adhesive applicator 58. The details of the preferred applicator are best shown in FIGURES 17 and 18, but this is to be understood as simply one illustrative embodiment thereof.

The nozzle or injection needle 57 communicates through duct 61 to a melting pot or chamber 62 containing molten thermoplastic adhesive 63. The space above the level of the molten adhesive 63 is subject to superatmospheric gas pressure from source 64 through pneumatic pressure line 65 and a combination pressure reducing and relief valve 66 which will maintain the pressure above the liquid 63 at a preselected value, for example 40 p.s.i. Preheated molten plastic material will periodically be admitted to chamber 62 through manually operated valve 67 from a storage chamber 68 which is subject through reducing valve 71 to superatmospheric gas pressure at a value higher than that existing in chamber 62, for example 60 p.s.i. Both chambers 62, 68 are heated by heating elements 72 to maintain the adhesive plastic.

In order to control the flow of molten adhesive through the nozzle 57, duct 61 is provided with a screw conveyor 73 having a shaft 74 which extends through the wall of chamber 62 through a packing gland 75. Shaft 74 is driven by motor 77 through gear reducer box 76 under the control of an electromagnetic clutch 78 or the like. When the clutch is energized to turn the screw 73, the combined effect of the rotating screw and pneumatic pressure in the chamber 62 will cause flow of adhesive from the nozzle 57 through its orifice 81 and against the marginal strip portions 82 of web 32, as shown in FIGS. 1 and 16.

Immediately following the injection needle 81 and bearing against opposed faces of the marginal strips 82 are a pair of pressure shoes 80, 83. Shoe 80 is adjustably fixed on stem 85. Shoe 83 is mounted on bell crank 86 biased by spring 84 to press shoe 83 toward shoe 80 and against the exposed faces of marginal strips 82. The shoes 80, 83 are disposed to press those regions of strips 82 between which lies the bead or ribbon 89 of thermoplastic adhesive which is discharged through orifice 81 of nozzle 57.

The adhesive bead 89 sets on cooling and the shoes 80, 83 not only provide pressure, but remove heat from the adhesive bead 89 to facilitate quick setting thereof so that after the strips 82 have passed shoes 80, 83, the adhesive has set and the strips are sealed, or joined, together. If desired, the shoes 80, 83 can constitute rollers. In preferred embodiments of the invention, however, the respective shoes 80, 83 are fixed on their stems but may be turned thereon periodically to provide fresh bearing surfaces to the web strips which travels therebetween.

Where the pad 30 is tapered, as shown in FIGS. 1 and 10, it will necessarily require more wrapping material around its wide portion than around its narrow portion. between successive pads will have reduced requirements for wrapping material. Accordingly, the abutting strips 82 will vary in width according to sleeve contents. As best shown in FIG. 20, tapered pads 30 are desirably disposed in the sleeve 98 with their narrow ends facing one another and their wide ends facing one another. Accordingly, successive pads face in opposite directions and are fed to the machine in alternate positions by the belt 31 of FIG. 1. This means that even less wrapping material is needed between the facing narrow ends of the pads than between the facing wide ends of the pads.

In any event, excess width will constitute waste 87 which will be severed from the strips 82 by the rotary knife 88 which bears against a platen roller 91, as shown in FIGURE 15. Knife 88 and platen roller 91 are desirably rotatably mounted on axle shafts 92 which depend from superstructure not shown in the drawings. The upstanding strip 82 is desirably held upright by the roller 93 which bears against a stationary guide plate 94. The waste 87 will vary in width for the reasons aforestated. The remaining strip or seam 105 between the adhesive bead 89 and the line of severance by knife 88 will be of uniform width.

The apparatus of FIG. 1 is desirable slightly upwardly inclined as is shown in FIG. 16. The preferred angle with the horizontal is 7 degrees. Slightly beyond cutoff knife 88, belt 33 is trained over an idler roller 95 mounted on a swing lever 96 which is biased by spring 97 toward its uppermost position. Roller 95 may yield depending upon circumstances and particularly according to the contents of sleeve 98. Note from FIG. 16 that sleeve 98 is removed from the belt 33 horizontally so that there is a small angle (about 15 degrees) between its horizontal run leaving belt 33 over end roller 101 and the upwardly inclined run thereof which is bent about roller 95. Accordingly, the sealed strip or seam 105 is placed under downward tension as it passes over roller 95 to fold strip 105 over against the top of the sleeve 98. A folding finger 100 may optionally be provided to insure orderly folding of the seam 105 at this point. Finger 100 will insure that the seam 105 will always lay in the same direction under tension of the bending of the sleeve 98 around roller 95.

Where the pads 30 are tapered and are fed to the machine with their tapered ends alternately reversed, as aforestated, and as is shown in FIGS. 10 and 20, the connective web links 103 and 104 will be alternately narrow and wide, depending on which ends of the pad define the web width. Relatively wide web 104 will ordinarily consist only of two plies of wrapping material, as shown in FIG. 14. The shape of the pad adjacent the wide end thereof is illustrated by FIGURE 13, showing the absence of tucking of the web 103 in this area. Web 103, because narrower, and because the excess material thereof is not entirely removed in the form of waste 87, is tucked into multiple plies so that it will be relatively flat and neat without bulging or irregularities, as shown in FIG. 11. The mechanism by which the web 103 is tucked and the web link portions adjacent the ends of the pads sealed will now be described.

As diagrammatically shown in FIG. 2, sleeve 98 is drawn from the ensleeving mechanism shown diagrammatically in FIG. 1 by mechanism which flattens the web links 103, 104 between spaced pads 30 and also tucks into multiple folds the web portions 103 which interconnect the narrow ends of tapered pads. The specific apparatus therefor is best shown in FIGS. 19 through 24.

To place the strip under longitudinal tension and draw it from the ensleeving mechanism, there are upper and lower propelling chain conveyors 106, 107. Each of these is provided with complementary sets of thick gripping bars 108, 109 and complementary sets of thin gripping bars 12, 113. Each bar is mounted on a separate chain link to be articulate with respect to the other bars to negotiate the curved path of the chains around sprockets 120, 121, 138. Bars 108, 109 are provided in sufficient number in each set to grip the web links 103, 104 between pads 30, the paired sets 112, 113 of gripping bars which come opposite the pads 30 being thinner than the bars in sets 108, 109, so as to provide pockets between the chains 106, 107 to receive the pads 30, as shown in FIG. 19.

Accordingly, the plies of wrapping material 32 in the connective links 103, 104 between the pads 30 will be pressed together to flatten them in a horizontal plane as an incident to the action of chains 106, 107 in propelling the sleeve 98 through the machine.

In addition to the upper and lower chain sets 106, 107, the present invention provides for laterally disposed sets of chains 114, 115, which carry sets 116, 117 of tucking fingers 122, which tuck the web links 103 into the multiple ply formation shown in FIG. 11. As in the case of the pulling bar sets 108, 109, 112, 113, each of the tucking fingers 122 in the sets 116, 117 is individually mounted on separate links of the chain 114, 115 so that as the chains negotiate the corners provided at the sprockets 118, 119, the respective fingers will sequentially indent and tuck the web material between the narrow ends of the pads 30.

The chains 114, 115 have a rectilinear path of movement parallel to the path of sleeve travel. Accordingly, the only relative movement between the fingers 122 and the sleeve 98 is when the fingers are entering and leaving the sleeve.

The sets 116, 117 of tucking fingers 122 are so spaced on chains 114, 115 that they will tuck only the webs 103. Webs 104 do not ordinarily require any such tucking as aforestated.

As best shown in FIG. 22, the respective fingers 122 of sets 116, 117 will be accommodated between those alternate bars 123 of the bar sets 108, 109 which are slightly thinner than staggered alternate bars 124 thereof. Bars 124 are of sufficient thickness to tightly clamp against the multiple plies of web 103. Bars 123 are sufficiently thinner than bars 124 to leave room therebetween for the intervening fingers 122. This is best illustrated in FIGS. 22 and 24. Accordingly, fingers 122 cooperate with bars 123, 124 to tuck the web links 103 concurrently with the pulling thereof to convey the sleeve 98 through the machine.

Note from FIG. 20 that endmost fingers in each set 116, 117 are provided with roller wheels 125. The fingers which support the wheels 125 are shorter than the other fingers 122 in the set. The fingers 122 which intervene between the endmost fingers tuck the web link 103 while the endmost fingers produce partial tucks in the narrow ends of the pad 30, as is best shown in FIG. 12. The wheels 125 may turn slightly as they first make contact with the pads 30, to avoid tearing the wrapper.

It is clear that tucking fingers 122 can be used to advantage wherever it is desired to tuck web portions between successive spaced pads, even where the pads are not tapered. If the pads have rounded ends so that an excess of sleeve material would otherwise gather adjacent thereto, such ends and the web links between pads can be tucked with the tucking mechanism of the type herein disclosed, it being necessary only that such fingers be provided in the proper number, size and spacing to produce appropriate tucks wherever desired. Such tucking fingers will desirably coact with the gripping bars 123, 124 as shown in FIGS. 22 through 24.

As best shown in FIGS. 19 and 21, the chain 107 may consist of two parallel runs, each of which is slidably supported on skid bars 126 to provide a positive backing for the gripping bars 123, 124. Similar backing bars 127 are provided for the chains 114, 115 to positively guide these chains and the tucking fingers 122 thereon. Uppermost propelling chain 106 is yieldably supported above the path of the sleeve 98. There is a fixed pair of rails 128 carrying a series of non-rotatable cross pins 131 on which arms 132 are rockably supported. The ends of the swing arms 132 pivotally carry paired segmented shoes 134 on rocker pintles 133. Segmented shoes 134 back up the chain 106. The paired shoes 134 are biased downwardly by coil springs 135, one for each of the rocker arms 132 and which react between the cross pins 131 and rocker pintles 133. Accordingly, any link of the chain 106 may yield upwardly against the bias of appropriate spring 135 in the event there is a non-uniformity in the thickness of the contents of sleeve 98 travelling beneath the chain 106.

The mechanism shown in FIGS. 19 and 20 will press together the plies of the web links 103, 104 between pads, tuck the webs 103 into neat multiple folds, and will propel the sleeve 98 forwardly through the machine.

The sleeve 98 is trained about two pocketed rollers 136, 137 after the sleeve passes around the end sprocket 138 of the propelling unit aforesaid. Rollers 136, 137 have peripheral portions 141 of such a circumferential length and spacing that the web portions 103, 104 of the sleeve 98 will fit thereagainst. The portions of the sleeve containing the pads 30 will be received within the pockets 142 formed in the periphery of the rollers. The junction between the webs 103, 104 and the pads 30 will thus come adjacent heated shoes 143 with which the rollers 136, 137 are provided to heat seal opposite plies of the web portions together and hence maintain the shape of the web links after the sleeve is drawn from the rollers 136, 137 by the delivery belt conveyor 144.

Shoes 143 are desirably provided with electric heating elements 145, although any mode of heating the shoes 143 may be employed. Shoes 143 on wheel 136 will press the web material against the shoes 140 on wheel 137 in the course of their counter-rotation.

The heat applied to the shoes 143 and to the wheels 136, 137 will tend to "iron" the portions of the sleeve 98 contacted thereby so as to remove unwanted creases and wrinkles in the wrapping material as well as effecting a seal of the web portions adjacent the ends of the pad. Cut off rollers 146 will sever the sleeve 93 midway of the webs 103, 104 to produce napkins as shown in FIG. 10.

From the foregoing, it is clear that the apparatus of the present invention will fabricate either tapered or non-tapered sanitary napkins and will ensleeve napkin pads in a procedure which will result in a butt seam between marginal portions of the wrapping material. This seam is then cut off to a uniform width and is laid down medially of the sleeve. Wherever desired, and particularly where the napkin pad is tapered or has a narrow end, there is provision for tucking excess web material in the web link. The tucking fingers have a rectilinear path of movement along with the sleeve. The ensuing linked together pads are then subjected to a heat treatment which will seal the web links near the ends of the pads and will also iron out wrinkles therein. The sleeve is then severed through the web links 103, 104, the said links functioning thereafter as attaching means for the napkin pads.

I claim:

1. In a machine for the manufacture of sanitary napkins or the like, the combination of means for conveying a web of napkin wrapping material having a series of spaced napkin pads disposed on the web, means for folding marginal strip portions of the web into upstanding, abutting relation on substantially the medial line of the web to ensleeve said pads portions of which abutting upstanding marginal strip portions of the web most remote from said pad comprise excess material, said last-named means tensioning said web transversely to snugly wrap said pads, means for joining together said abutting strip portions along a line adjacent said pads, and means for severing excess abutting strip portions of the web from the sleeve along a line substantially parallel to the line of jointure.

2. The machine of claim 1 in which said folding means comprises a series of web folding plate portions which fold said marginal strip portions of said web about said pads, and a series of longitudinally spaced roller means associated with said plate portions, said plate portions and associated roller means being disposed at progressively different angles to the path of web travel to progressively fold said strip portions into abutting face relation.

3. The machine of claim 1 in which said joining means comprises means for injecting a thermoplastic adhesive into the space between said abutting strips.

4. The machine of claim 3 in which the last mentioned means comprises a nozzle between the abutting web strips, in further combination with a web strip divider ahead of said nozzle to provide a space therefor.

5. The machine of claim 4 in further combination with means acting on said strips beyond said nozzle for pressing said web strips and intervening adhesive together.

6. The device of claim 3 in which the last mentioned means comprises a heated adhesive container, a nozzle and a screw conveyor between said container and nozzle.

7. The device of claim 6 in further combination with means to subject said container to superatmospheric pressure, and means for selectively actuating said screw conveyor to selectively discharge molten adhesive from said nozzle.

8. In a machine for the manufacture of sanitary napkins or the like from pads which have an end portion of less girth than another portion, means for ensleeving such napkin pads with wrapping material to form a sleeve having pad filled portions and unfilled web links therebetween, means for tucking the wrapping material of web links to smooth and compact said web links, such tucking means comprising a conveyor having a run disposed on a rectilinear path of movement parallel to the movement of the sleeve, said conveyor having thereon a plurality of mutually articulate tucking fingers to infold portions of the web links between pads.

9. The machine of claim 8 in combination with a sleeve propelling mechanism comprising opposed conveyors having runs disposed on rectilinear paths of movement parallel to the movement of the sleeve, said opposed conveyors having thereon a plurality of mutually articulate draw bars which coact to clamp the sleeve therebetween and propel the sleeve, certain of said bars being thinner than other bars to receive therebetweeen the said tucking fingers.

10. In a machine of the character described for fabricating ensleeved napkin pads or the like which are longitudinally spaced in the sleeve and are interconnected by sleeve webs of thermo-adhesive wrapping material, a wheel having a circumferential pocket within which an ensleeved pad is received and having an unpocketed peripheral portion about which an interconnecting web is disposed, and heating means at the juncture of said pocketed and unpocketed peripheral portions of the wheel for heat sealing the web adjacent the ends of the pads.

11. The device of claim 10 in combination with a second wheel having pockets complementary to those on the first wheel, and means mounting said wheels for counter-rotation and pursuant to which the thermoadhesive web material is sealed.

12. In a machine for the manufacture of sanitary napkins or the like, the combination of means for conveying a web of napkin wrapping material having a series of spaced napkin pads disposed on the web, said pads varying in cross-sectional area along their length, means for folding marginal strip portions of the web into upstanding, abutting relation on substantially the medial line of the web to ensleeve said paids, said last-named means tensioning said web transversely to snugly wrap said pads and draw into abutting relationship wider marginal strip portions of the web from web wrapping and forming a sleeve about said pad at portions of said pad having a smaller cross-sectional area than from web wrapping and forming a sleeve about said pad at portions of said pad having a larger cross-sectional area, whereby the abutting marginal strip portions of the web vary in width along the sleeve, and means for joining together said abutting strip portions along a line adjacent said pads.

13. In a machine for the manufacture of sanitary napkins or the like, the combination of means for conveying a web of napkin wrapping material having a series of spaced napkin pads disposed on the web, said pads varying in cross-sectional area along their length, means for folding marginal strip portions of the web into upstanding, abutting reaction on substantially the medial line of the web to ensleeve said pads, said last-named means tensioning said web transversely to snugly wrap said pads and draw into abutting relationship wider marginal strip portions of the web from web wrapping and forming a sleeve about said pad at portions of said pad having a smaller cross-sectional area than from web wrapping and forming a sleeve about said pad at portions of said pad having a larger cross-sectional area, whereby the abutting marginal strip portions of the web vary in width along the sleeve and include excess web material most remote from said pad, means for joining together said abutting strip portions along a line adjacent said pads, and means for severing excess abutting strip portions of the web from the sleeve along a line substantially parallel to the line of jointure.

14. In a machine for the manufacture of sanitary napkins or the like, the combination of means for conveying a web of napkin wrapping material having a series of spaced napkin pads disposed on the web, said napkin pads being longitudinally tapered, means for folding marginal strip portions of the web into upstanding, abutting relation on substantially the medial line of the web to ensleeve said pads, said last-named means tensioning said web transversely to snugly wrap said pads and draw into abutting relationship wider marginal strip portions of the web from web wrapping and forming a sleeve about said pad at portions of said pad having a smaller cross-sectional area than from web wrapping and forming a sleeve about said pad at portions of said pad having a larger cross-sectional area, whereby the abutting marginal strip portions of the web vary in width along the sleeve, and includes excess web material most remote from said pad, means for joining together said abutting strip portions along a line adjacent said pads, and means for severing excess abutting strip portions of the web from the sleeve along a line substantially parallel to the line of jointure.

References Cited by the Examiner

UNITED STATES PATENTS

| | | | |
|---|---|---|---|
| 2,296,931 | 9/1942 | Joa | 19—144.5 X |
| 2,613,400 | 10/1952 | Riordan et al. | 19—144.5 |
| 2,618,816 | 11/1952 | Joa | 19—144.5 |
| 2,815,027 | 12/1957 | Makela | 128—290 |
| 2,833,283 | 5/1958 | Spahr et al. | 128—290 |
| 2,960,143 | 11/1960 | Joa | 19—145 |
| 2,973,760 | 3/1961 | Dudley | 128—290 |
| 3,020,599 | 2/1962 | Pukis et al. | 19—144.5 |

FOREIGN PATENTS

| | | |
|---|---|---|
| 1,011,746 | 4/1952 | France. |
| 716,847 | 10/1954 | Great Britain. |

MERVIN STEIN, *Primary Examiner.*

DONALD W. PARKER, RICHARD J. HOFFMAN,
*Examiners.*

D. NEWTON, C. F. ROSENBAUM, *Assistant Examiners.*

UNITED STATES PATENT OFFICE
CERTIFICATE OF CORRECTION

Patent No. 3,289,254　　　　　　　　　　　　　　December 6, 1966

Curt G. Joa

It is hereby certified that error appears in the above numbered patent requiring correction and that the said Letters Patent should read as corrected below.

Column 2, line 34, for "Fig. 4" read -- Fig. 14 --; column 4, line 42, before "between" insert -- Moreover, web portions around the gaps intervening --; line 65, for "desirable" read -- desirably --; column 5, line 39, for "12" read -- 112 --; column 6, line 41, after "which" insert -- swing --; column 7, line 33, after "excess" insert -- web --; column 8, line 38, for "paids" read -- pads --; line 57, for "reaction" read -- relation --.

Signed and sealed this 19th day of September 1967.

(SEAL)
Attest:

ERNEST W. SWIDER　　　　　　　　　　　　　　EDWARD J. BRENNER
Attesting Officer　　　　　　　　　　　　　　Commissioner of Patents